United States Patent
Yanakiev et al.

(10) Patent No.: US 9,488,267 B2
(45) Date of Patent: Nov. 8, 2016

(54) LINE PRESSURE CONTROL WITH INPUT SHAFT TORQUE MEASUREMENT

(75) Inventors: Diana Yanakiev, Birmingham, MI (US); Gregory Michael Pietron, Canton, MI (US); Yuji Fujii, Ann Arbor, MI (US); Stefano Di Cairano, Cambridge, MA (US); Joseph F. Kucharski, Livonia, MI (US); Bradley Dean Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 710 days.

(21) Appl. No.: 13/617,788

(22) Filed: Sep. 14, 2012

(65) Prior Publication Data

US 2014/0081541 A1    Mar. 20, 2014

(51) Int. Cl.
| | |
|---|---|
| F16H 61/00 | (2006.01) |
| F16D 48/06 | (2006.01) |
| F16H 61/04 | (2006.01) |
| F16H 61/68 | (2006.01) |
| F16H 59/14 | (2006.01) |

(52) U.S. Cl.
CPC ......... *F16H 61/0021* (2013.01); *F16D 48/06* (2013.01); *F16D 2500/1026* (2013.01); *F16D 2500/1027* (2013.01); *F16D 2500/3024* (2013.01); *F16D 2500/3027* (2013.01); *F16D 2500/30406* (2013.01); *F16D 2500/70406* (2013.01); *F16H 59/14* (2013.01); *F16H 61/04* (2013.01); *F16H 61/68* (2013.01); *Y10T 477/6425* (2015.01)

(58) Field of Classification Search
CPC .... F16H 61/0021; F16H 61/04; F16H 61/68; F16H 59/14; F16D 48/06; F16D 2500/1026; F16D 2500/1027; F16D 2500/3024; F16D 2500/3027; F16D 2500/30406; F16D 2500/70406; Y10T 477/6425
USPC ........................................... 701/51, 67
See application file for complete search history.

(56) References Cited

U.S. PATENT DOCUMENTS

| | | | |
|---|---|---|---|
| 4,263,826 A * | 4/1981 | Hartz et al. ..................... 477/30 |
| 4,502,354 A | 3/1985 | Suzuki et al. | |
| 4,582,185 A * | 4/1986 | Grimes et al. ................. 477/169 |
| 4,706,790 A * | 11/1987 | Lockhart et al. ............... 192/3.3 |
| 4,875,391 A * | 10/1989 | Leising et al. ................. 477/155 |
| 4,907,475 A * | 3/1990 | Holbrook ....................... 477/134 |
| 4,938,102 A * | 7/1990 | Leising et al. ................. 477/154 |
| 4,982,620 A * | 1/1991 | Holbrook et al. ........... 74/731.1 |
| 5,115,698 A * | 5/1992 | Leising et al. ................... 475/65 |
| 5,323,668 A | 6/1994 | Nakagawa et al. | |
| 5,400,678 A | 3/1995 | Jain et al. | |
| 5,443,594 A | 8/1995 | Takada et al. | |

(Continued)

FOREIGN PATENT DOCUMENTS

| | | |
|---|---|---|
| JP | 404069451 A | 3/1992 |
| JP | 2010221954 | 10/2010 |

*Primary Examiner* — Aaron L Troost

(57) ABSTRACT

A method of controlling a line pressure in a transmission is provided. Line pressure in a transmission is set to a pressure value including a first term that is proportional to an input torque value. The first term has a coefficient of proportionality that is increased in response to a signal indicating clutch slippage. The input torque value is a measured input torque value in a steady-state condition. The input torque value may be a maximum of the measured input torque value and a driver demand torque value in a transient condition.

18 Claims, 2 Drawing Sheets

(56) References Cited

U.S. PATENT DOCUMENTS

| | | |
|---|---|---|
| 5,458,545 A | 10/1995 | Adam et al. |
| 5,726,353 A * | 3/1998 | Matsuda et al. ............ 73/115.02 |
| 5,776,032 A * | 7/1998 | Kurishige et al. ............ 477/175 |
| 6,022,293 A * | 2/2000 | Dourra et al. ................ 477/158 |
| 6,039,675 A * | 3/2000 | Adachi et al. ................ 477/174 |
| 6,087,734 A * | 7/2000 | Maeda et al. ................ 290/40 C |
| 6,319,170 B1 * | 11/2001 | Hubbard et al. .............. 477/107 |
| 6,487,925 B2 | 12/2002 | Fischer et al. |
| 6,565,483 B2 * | 5/2003 | Segawa et al. ............... 477/174 |
| 6,658,338 B2 * | 12/2003 | Joe et al. ........................ 701/51 |
| 6,685,597 B2 | 2/2004 | Satou et al. |
| 6,754,574 B2 * | 6/2004 | Tokura et al. .................. 701/67 |
| RE38,790 E * | 9/2005 | Maeda et al. ................ 290/40 C |
| 7,164,981 B2 | 1/2007 | Kim |
| 7,302,870 B2 * | 12/2007 | Vilou et al. ....................... 74/7 C |
| 7,447,582 B2 | 11/2008 | Mori et al. |
| 8,052,577 B2 * | 11/2011 | Tamba et al. ................. 477/168 |
| 8,100,802 B2 * | 1/2012 | Lee et al. ......................... 475/62 |
| 8,498,765 B2 * | 7/2013 | Tajima et al. ................... 701/22 |
| 2003/0093207 A1 * | 5/2003 | Pallot ............................. 701/70 |
| 2004/0129096 A1 * | 7/2004 | Vilou et al. ..................... 74/7 C |
| 2007/0288148 A1 * | 12/2007 | Cui et al. ........................ 701/51 |
| 2009/0171545 A1 | 7/2009 | Shimizu et al. |
| 2009/0248264 A1 * | 10/2009 | Kubo ............................. 701/58 |
| 2009/0325757 A1 * | 12/2009 | Dromard et al. .............. 477/62 |
| 2010/0108420 A1 * | 5/2010 | Keiji ........................ 180/65.275 |
| 2011/0035085 A1 * | 2/2011 | Falkenstein .................... 701/22 |
| 2011/0112734 A1 * | 5/2011 | Whitney et al. ................ 701/54 |
| 2011/0112738 A1 * | 5/2011 | Reuschel ........................ 701/68 |
| 2011/0246036 A1 * | 10/2011 | Tsutsui et al. .................. 701/67 |
| 2011/0257856 A1 * | 10/2011 | Tsutsui et al. .................. 701/67 |
| 2012/0226431 A1 * | 9/2012 | Mitsuhashi ................... 701/105 |
| 2012/0255294 A1 * | 10/2012 | Heren et al. ................... 60/487 |
| 2012/0329588 A1 * | 12/2012 | Iraha et al. ..................... 474/11 |
| 2013/0012353 A1 * | 1/2013 | Yoshida et al. ................... 477/5 |
| 2013/0053214 A1 * | 2/2013 | Kawai et al. ..................... 477/5 |
| 2013/0116902 A1 * | 5/2013 | Hodrus ........................... 701/67 |

\* cited by examiner

LINE PRESSURE CONTROL WITH INPUT SHAFT TORQUE MEASUREMENT

TECHNICAL FIELD

The present disclosure relates to controlling hydraulic line pressure for a gearbox, or an automatic transmission.

BACKGROUND

Hydraulic line pressure is used to engage clutches to select gear ratios in automatic transmissions or other types of hydraulically controlled gear boxes. Line pressure is controlled to avoid clutch slippage and to minimize energy consumption resulting from maintaining excessive line pressure. Controlling the line pressure of an automatic transmission affects fuel economy, the ability to control the transmission, and drive quality.

Ideally, the line pressure should be maintained at a level that is sufficient to sustain the holding capacity of the engaged clutches. The hydraulic pump may waste energy if the hydraulic line pressure is excessive. In addition, excessive line pressure may make clutch valve control more difficult due to the higher gain caused by the excessive line pressure. If line pressure drops to less than the level necessary to prevent clutch slippage, disturbances in the driveline may occur. Clutch slippage may also lead to thermal damage to the clutch lining.

In prior production transmissions, input shaft torque is estimated that causes some uncertainty and inaccuracy in controlling line pressure. U.S. Pat. Nos. 5,400,678 and 6,685,597 were considered in conjunction with the preparation of this patent application.

This disclosure is directed to solving the above problems and other problems that will be apparent in view of the following summary of the disclosure.

SUMMARY

According to one aspect of this disclosure, a method is disclosed for commanding hydraulic pressure to engage a clutch. The method comprises periodically adjusting setting the hydraulic pressure in proportion to an input torque value based on a coefficient of proportionality, and increasing the coefficient of proportionality in response to a signal indicating a slip of the clutch so the hydraulic pressure is increased for all positive input torque values.

According to other aspects of the method, the hydraulic pressure is not adjusted in response to a signal indicating clutch slippage when the input torque is zero. The transmission may provide a finite number of discrete speed ratios between an input shaft and an output shaft, and the method may further comprise selecting a different coefficient of proportionality for some of the speed ratios.

The input torque value may be a measured input torque value in a steady state condition. The input torque value may be a maximum of the measured input torque value and a driver demand torque value in a transient condition. The difference between the driver demand torque value and the measured input torque value is recorded in a steady state condition. The difference between the driver demand torque value and the measured input torque value is added to the driver demand torque value in a transient condition.

The coefficient of proportionality may be decreased when the clutch is not slipping. The coefficient of proportionality may be decreased only when it is greater than a predetermined initial coefficient.

According to another aspect of the disclosure, a transmission is provided that includes an input shaft, a clutch, the torque capacity of the clutch varying in relation to a hydraulic pressure, and a controller. The controller is in communication with pressure regulating devices that receive signals from the controller to influence the hydraulic pressure. The controller is configured to set the hydraulic pressure to a pressure value in proportion to an input torque value based upon a coefficient of proportionality. The coefficient of proportionality is increased in response to the detection of clutch slip events.

According to other aspects of the disclosure, the transmission may have a finite number of discrete speed ratios that are provided between an input shaft and an output shaft. The transmission may further comprise selecting a different coefficient of proportionality for some of the speed ratios.

According to other aspects of the disclosure as it relates to a transmission, the input torque value may be a measured input torque value in a steady state condition. The input torque value is a maximum of the measured input torque value and a driver demand torque value in a transient condition. In a steady state condition, the difference between the driver demand torque value and the measured input torque value is recorded. In a transient condition, the difference is added to the driver demand torque value.

This disclosure is also directed to a transmission controller that comprises input communication channels for sensing an input torque and the speeds of at least two shafts, output communication channels for setting the state of pressure regulating devices, and control logic for controlling the hydraulic pressure. The control logic is configured to send signals to the pressure regulating devices to set the hydraulic pressure to a pressure value. The pressure value includes a first term which is proportional to an input torque value, the term having a coefficient of proportionality. Clutch slip events are detected and coefficient of proportionality may be increased in response to the slip events.

According to other aspects of the disclosure relating to the transmission controller, the pressure value may include a second term that is independent of the input torque value. The input torque value may be a measured input torque value in a steady state condition. The coefficient of proportionality may be decreased when the clutch is not slipping. The coefficient of proportionality may be decreased only when it is greater than a predetermined initial coefficient.

The above aspects of this disclosure and other aspects will be better understood in view of the attached drawings and the following detailed description of the illustrated embodiments.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
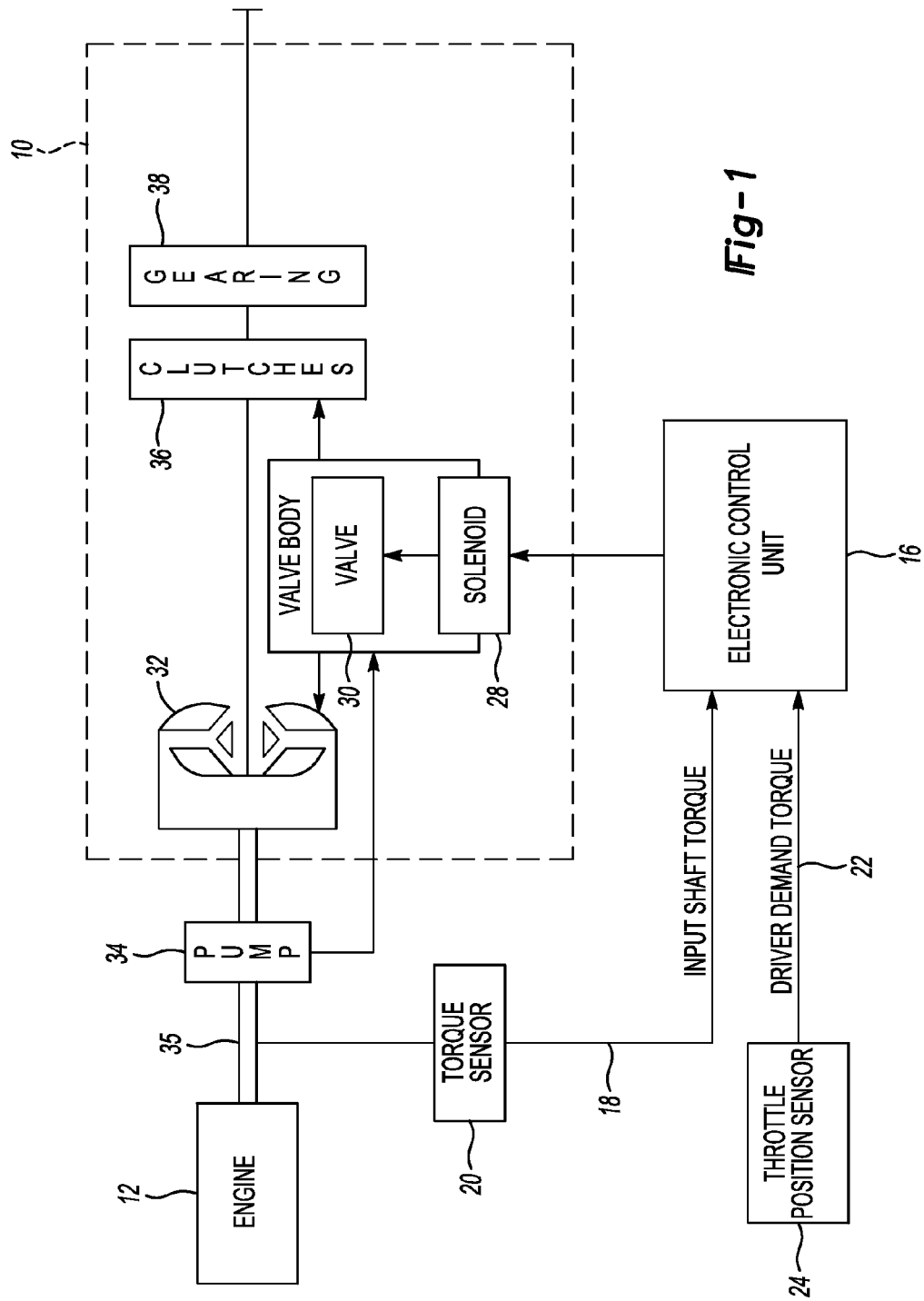
FIG. 1 is a diagrammatic representation of a transmission for an engine that is controlled by an electronic control unit.

Referring to FIG. 1, an automatic transmission 10 is illustrated diagrammatically to show an engine 12 that provides torque to the transmission 10. An electronic control unit (ECU) 16 controls operation of the transmission 10 based, in part, upon a signal on line 18 that is received from a torque sensor 20 providing an actual torque measurement. The electronic control unit 16 also receives a driver demand torque 22 from a throttle position sensor 24. The electronic control unit 16 can be physically integrated with the transmission 10 or can be mounted remotely. The electronic control unit 16 can be a stand-alone transmission control unit or can be a portion of a powertrain or vehicle controller that also controls other components.

The electronic control unit 16 controls the transmission 10 by providing control signals to a valve body 26. A transmission pump 34 driven by the transmission input shaft 35 pressurizes hydraulic fluid entering the valve body 26. The valve body 26 includes one or more solenoids 28 that are used to actuate one or more valves 30 within the valve body 26. The pressure of the incoming fluid is called the line pressure and is controlled by electronic control unit 16 via the solenoids 28 and valves 30 in the valve body. The pump extracts mechanical energy from the input shaft, thereby increasing the amount of fuel required by the engine 12 to deliver a given amount of power to the driven load. Incremental fuel usage increases when line pressure increases.

The valve body 26 ports hydraulic fluid to a plurality of clutches 36 that are used to control a step ratio gear set 38. In some operating conditions, hydraulic fluid at line pressure is routed by valves to one of the clutches 36. In other operating conditions, valves may route hydraulic pressure at a reduced pressure to one of the clutches 36, with the reduced pressure controlled by the electronic control unit 16 via the solenoids 28 and valves 30.

The torque capacity of a clutch is a function of the hydraulic pressure supplied to that clutch by the valve body. The relationship between pressure and torque capacity is approximately linear with a proportional term and a constant term. The constant term and the coefficient of the proportional term are dictated by physical characteristics of the clutch. Some of these characteristics, such as coefficient of friction, may fluctuate during operation. The torque transmitted by a fully engaged clutch is approximately proportional to the input torque. Clutch slip occurs when the input torque is too high relative to the torque capacity of a clutch.

Figure 2:
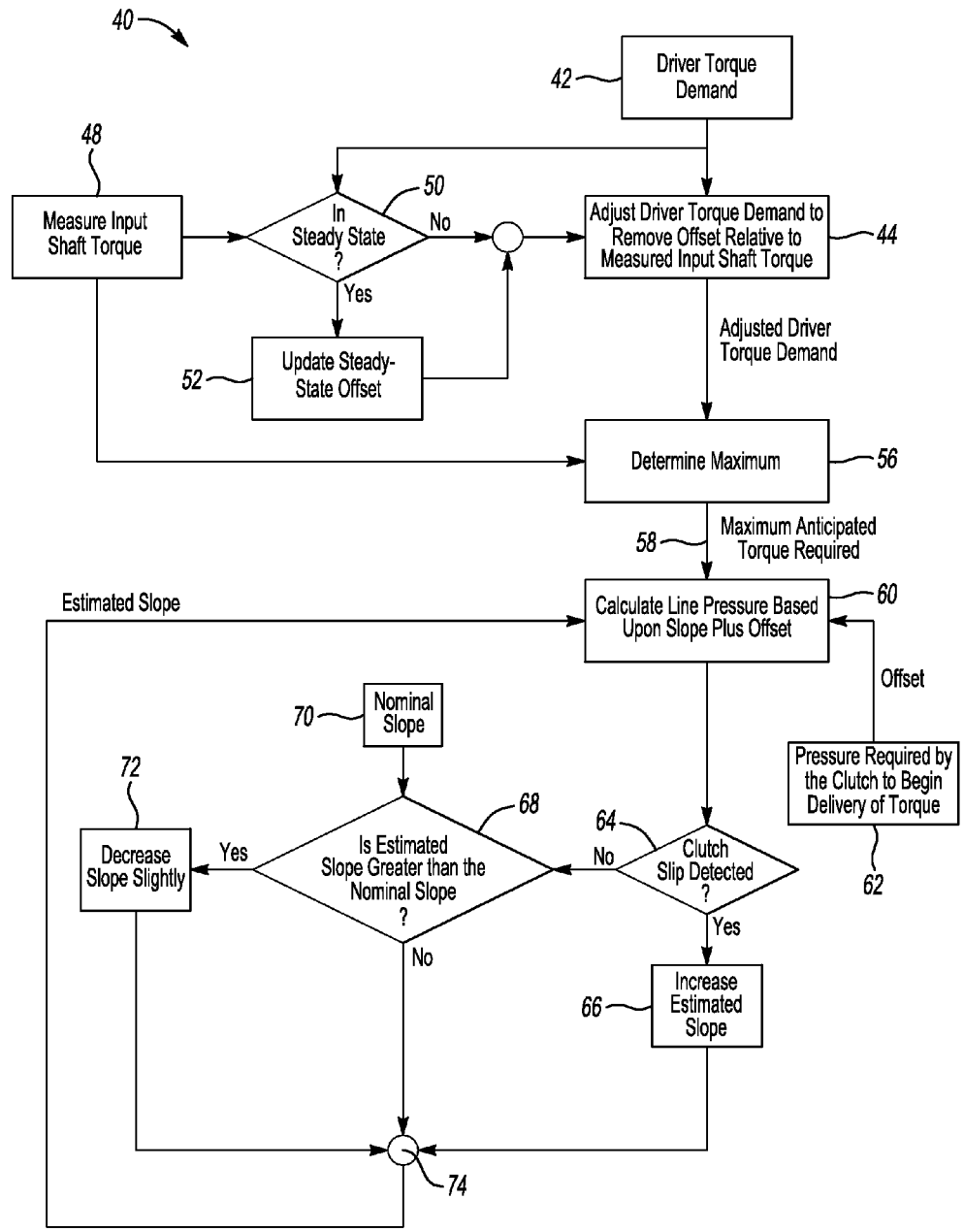
FIG. 2 is a flowchart illustrating an algorithm for controlling line pressure in a transmission based upon actual input shaft torque measurement data.

Referring to FIG. 2, an algorithm 40 is illustrated that may be used to control line pressure within an automatic transmission 10. The algorithm 40 is described beginning with a determination of the driver torque demand at 42. The driver torque demand may be based upon the position of the driver's foot or may be derived from another source such as a cruise control system. The driver torque demand value can be calculated within the ECU or may be otherwise provided to the ECU 16.

The input shaft torque is measured at 48. Although the engine is controlled to deliver the driver demand torque, the measured input shaft torque can differ from the driver demand torque due to inherent delays or control system inconsistencies. An offset value may be added to the driver demand torque at 44 to compensate for this difference to yield an adjusted driver demand torque. This offset value is based on the observed difference during steady state conditions. At 50, the controller determines whether the current operating condition is a steady state condition by evaluating the magnitude of recent changes in measured input shaft torque and in driver demand torque. If a steady-state condition is detected at 50, then the steady-state offset is updated at 52. Otherwise, the previous value of the steady state offset is retained. The maximum anticipated input torque is computed at 56 by taking the maximum of the measured input torque and the adjusted driver demand torque.

The line pressure is calculated at 60 as a linear function of the maximum anticipated input torque. The constant term 62 in this linear function is a predetermined value based on the pressure required for the clutches to begin transmitting torque. This pressure may be different for each of the clutches 36. The value 62 is dictated by the largest value among the clutches that are applied in the current gear ratio and therefore may differ among the various gear ratios. The slope of the linear function is dictated by the slopes of the torque capacity functions for the engaged clutches in the current gear ratio and the ratio of clutch torque to input torque for each of these clutches in the current gear ratio. Because the torque capacity functions can fluctuate during operation, the slope of the linear function used at 60 is adaptively determined. A predetermined nominal slope 70 is used initially. The nominal slope 70 may differ among the various gear ratios.

Clutch slippage in the transmission is detected at 64 by sensors that provide clutch slippage data to the ECU 16. If a clutch slip is detected, the estimated slope is incrementally increased at 66. If no clutch is detected at 64, the algorithm determines whether the estimated slope is greater than the nominal line slope at 68. If the estimated slope is greater than the nominal slope at 68, the ECU decreases the estimated slope slightly at 72.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A method of controlling a transmission comprising:
supplying a fluid at a pressure to engage a clutch;
periodically adjusting the pressure in proportion to an input torque value based on a coefficient of proportionality between pressure and torque; and
in response to a signal indicating slip of the clutch, increasing the coefficient of proportionality such that the pressure is increased for all positive input torque values.

2. The method of claim 1 wherein the pressure when input torque is zero is based on a constant coefficient which is not adjusted in response to the signal indicating slip of the clutch.

3. The method of claim 1 wherein the transmission provides a finite number of discrete speed ratios between an input shaft and an output shaft; and the method further comprises selecting a different coefficient of proportionality for some of the speed ratios.

4. The method of claim 1 wherein the input torque value is a measured input torque value in a steady state condition.

5. The method of claim 4 wherein, in a transient condition, the input torque value is a maximum of the measured input torque value and a driver demand torque value.

6. The method of claim 5 further comprising:
in a steady state condition, recording a difference between the driver demand torque value and the measured input torque value; and
in a transient condition, adding the difference to the driver demand torque value.

7. The method of claim 1 further comprising decreasing the coefficient of proportionality when the clutch is not slipping.

8. The method of claim 7 wherein the coefficient of proportionality is decreased only when it is greater than a predetermined initial coefficient.

9. A transmission comprising:
an input shaft;
a clutch having a torque capacity varying in relation to a hydraulic pressure; and
a controller in communication with pressure regulating devices such that signals from the controller influence the hydraulic pressure, the controller configured to
periodically adjust the hydraulic pressure in proportion to an input torque value based on a coefficient of proportionality between pressure and torque,
detect clutch slip events, and
increase the coefficient of proportionality in response to the slip events.

10. The transmission of claim 9 wherein a finite number of discrete speed ratios are provided between an input shaft and an output shaft, and wherein the controller is further configured to select a different coefficient of proportionality for some of the speed ratios.

11. The transmission of claim 9 wherein the input torque value is a measured input torque value in a steady state condition.

12. The transmission of claim 11 wherein, in a transient condition, the input torque value is a maximum of the measured input torque value and a driver demand torque value.

13. The transmission of claim 12 wherein the controller is further configured to:
in a steady state condition, record a difference between the driver demand torque value and the measured input torque value, and
in a transient condition, add the difference to the driver demand torque value.

14. A transmission controller comprising:
input communication channels for sensing an input torque and speeds of at least two shafts;
output communication channels for setting the state of pressure regulating devices; and
control logic configured to
send signals to the pressure regulating devices to set a hydraulic pressure to a pressure value, wherein the pressure value includes a first term which is proportional to an input torque value, the term having a coefficient of proportionality,
detect clutch slip events, and
increase the coefficient of proportionality in response to the slip events.

15. The transmission controller of claim 14 wherein the pressure value includes a second term that is independent of the input torque value.

16. The transmission controller of claim 14 wherein the input torque value is a measured input torque value in a steady state condition.

17. The transmission controller of claim 14 further comprising decreasing the coefficient of proportionality when the clutch is not slipping.

18. The transmission controller of claim 14 wherein the coefficient of proportionality is decreased only when it is greater than a predetermined initial coefficient.

* * * * *